United States Patent [19]

Larson et al.

[11] Patent Number: 5,069,888
[45] Date of Patent: Dec. 3, 1991

[54] PROCESS FOR PASSIVATING URANIUM OXIDES TO CONTROL OXIDATION

[75] Inventors: Richard I. Larson; Abdul G. Dada; John L. Harmon, all of Wilmington, N.C.

[73] Assignee: General Electric Company, San Jose, Calif.

[21] Appl. No.: 387,187

[22] Filed: Jul. 31, 1989

[51] Int. Cl.$^5$ ............................................. C01G 43/00
[52] U.S. Cl. ................................. 423/260; 264/0.5; 423/261; 427/6
[58] Field of Search ............... 423/260, 261; 264/0.5; 427/6

[56] References Cited

U.S. PATENT DOCUMENTS

| 3,761,547 | 9/1973 | Grossman et al. | 264/0.5 |
| 4,572,810 | 2/1986 | Le Blanc | 423/260 |
| 4,617,158 | 10/1986 | Braun et al. | 264/0.5 |
| 4,751,098 | 6/1988 | Parks et al. | 427/6 |

FOREIGN PATENT DOCUMENTS 646474  8/1962  Canada ............................... 423/261

OTHER PUBLICATIONS

Bannister, *J. Nucl. Materials*, "The Storage Behavior of Uranium Dioxide Powders", 26, (1968) pp. 174–184.

*Primary Examiner*—Edward A. Miller
*Attorney, Agent, or Firm*—Robert R. Schroeder

[57] ABSTRACT

A method of passivating the surface of particulate uranium oxides is disclosed comprising a process of continuously contacting uranium oxide particles with an oxygen containing and cooling counter flowing gas stream. The treatment produces a protective surface which inhibits subsequent oxygen chemisorption of the particulate uranium oxides.

20 Claims, 1 Drawing Sheet

PROCESS FOR PASSIVATING URANIUM OXIDES TO CONTROL OXIDATION

This invention is related to pending application for patent Ser. No. 232,965, filed Aug. 17, 1988, now abandoned, for a METHOD FOR PASSIVATING URANIUM OXIDES TO CONTROL OXIDATION, AND THE OXIDATION RESISTING URANIUM PRODUCT THEREOF.

FIELD OF THE INVENTION

This invention relates generally to the manufacture of fissionable nuclear fuel comprising oxides of enriched uranium for use in nuclear reactors. Low oxygen ratio uranium oxides such as uranium dioxide typically exhibit a strong propensity for continuing oxidation which often results in deleterious properties for fuel processing and/or service. The invention is particularly concerned with measures for controlling or preserving a desired oxygen to uranium ratio introduced into newly formed particulate uranium oxides, and effectively precluding subsequent spontaneous oxidation of the oxygen susceptible uranium when thereafter subjected to processing operations which frequently entail conditions that foster oxidation.

BACKGROUND OF THE INVENTION

Fissionable fuel grade uranium oxides for service in power generating nuclear reactors are commonly produced from uranium hexafluoride. There are two basic chemical procedures practiced in the industry for commercially carrying out this chemical conversion of uranium hexafluoride to uranium oxides for reactor fuel, and several variations on each.

One principal chemical conversion process is commonly referred to in this art as a "wet" process since the conversion reactions are affected by or carried out within an aqueous medium or liquid phase with the reactants in solution and/or as a solid suspension therein. Typically, this so-called wet process comprises hydrolyzing uranium hexafluoride ($UF_6$) in liquid water to form the hydrolysis product uranyl fluoride ($UO_2F_2$), adding ammonium hydroxide to the uranyl fluoride to precipitate the uranyl fluoride as solid ammonium diuranate [$(NH_4)_2 U_2O_7$], then dewatering the solids and calcining in a reducing atmosphere to produce an oxide of uranium (e.g. $UO_2$). This version of the wet process is frequently referred to as the "ADU" procedure since it normally entails the formation of ammonium diuranate.

The other principal chemical conversion process is commonly referred to in this art as the "dry" process since the reactions are mainly carried out in a gaseous medium and comprise vapor-phase reactions with respect to the components. Typically, this so-called dry process comprises either a one-step procedure or a two-step procedure. The one-step method simply consists of contacting uranium hexafluoride gas ($UF_6$) with a mixture of steam and hydrogen gas within a fluidized bed of particulate uranium oxide whereby solid uranium oxides (e.g. $U_3O_8$) and hydrogen fluoride (HF) are produced. The $U_3O_8$ is subsequently calcined in a reducing atmosphere to a lower oxide of uranium, e.g. $UO_2$. The two-step method consists of hydrolyzing uranium hexafluoride gas ($UF_6$) with steam to produce uranyl fluoride ($UO_2F_2$) followed by reducing the uranyl fluoride with both steam and hydrogen gas to an oxide of uranium (e.g. $UO_2$).

The uranium oxides commercially produced by such conventional methods comprise a fine relatively porous powder which is not suitable as such for use as fuel in a nuclear reactor. Typically, it is not a free-flowing, relatively uniform sized powder, but rather clumps and agglomerates of particles of varying sizes making it unsuitable to uniformly pack into units of an apt and consistent density. These uranium oxide powders often have very high particle surface areas.

Thus, the raw uranium oxide product derived from the chemical conversion is normally processed through conventional powder refining procedures such as milling and particle classification to provide an appropriate sizing of the powders. Such processing frequently includes blending of uranium oxide powders of different particle sizes or ranges and from different sources. Commonly the powdered uranium oxides are handled and conveyed through such processing operations by pneumatic means. Thus, the uranium oxides can be subjected to extensive exposure to air, and in turn, oxygen.

Aptly processed uranium oxide powders are press molded into "green" or unfired pellets which are subsequently sintered to fuse the discrete powder particles thereof into an integrated body having a unit density of about 98 percent of theoretical for the oxide of uranium, and suitable for utilization in the fuel system of a nuclear reactor.

Uranium dioxide is an exception to the law of definite proportions since "$UO_2$" actually denotes a single, stable phase that may vary in composition from $UO_{1.7}$ to $UO_{2.25}$. The thermal conductivity of uranium oxide decreases with increasing oxygen to uranium ratios. Thus, uranium dioxide having as low an O/U ratio as practical is preferred for use as fuel in nuclear reactors to enable the most efficient passage of heat generated within fissioning fuel material outward to an external heat transfer medium. However, since uranium dioxide powder oxidizes readily in air and absorbs moisture, the oxygen to uranium (O/U) ratio of the powder will increase significantly to an excess of that acceptable for use as nuclear fuel for effective operation of a nuclear reactor.

Uranium oxides suitable for fuel in typical nuclear reactor service can have an O/U ranging from about 1.70–2.015 to 1, and as a practical matter, an O/U ratio of approximately 2.0 and effectively as high as 2.015 has been used since it can be consistently produced in commercial sintering operations. In some instances, it may be practical to maintain the O/U ratio of the uranium dioxide at a level higher than about 2.00 at sintering temperature. For example, it may be more suitable under the particular manufacturing process to produce a nuclear fuel having an O/U ratio as high as 2.195, and then later treat the sintered product in a reducing atmosphere to obtain the desire U/O ratio. However, such an extra operation usually increases costs without added benefits.

Uranium oxides of low O/U ratios exhibit an especially high propensity for spontaneous oxidation to a higher ratio, or actual burning in air, which can be hazardous as well as introducing deleterious properties in the uranium oxides for their intended service. The magnitude of this affinity for oxidation of uranium and the rate of the oxidizing reaction is influenced by a number of conditions, in particular ambient temperatures, oxygen partial pressure and surface area of the oxide of uranium particles. Moreover, since the oxidation reaction of uranium is exothermic, the oxidation of uranium and the rate thereof is self-propagating and accelerating.

This proclivity to further oxidation of uranium oxides presents a significant factor, or potential problem when particulate oxides of uranium are stored or undergo processing such as milling, classifying or blending in unprotected atmospheres not excluding oxygen.

The presence of a high oxygen content in uranium oxides is known to modify its behavior in both processing or fabrication, and in performance of nuclear fuel. For instance, an oxygen ratio in excess of the uranium dioxide $U/O_2$ stoichiometric ratio has a decided effect upon the sintering rate of uranium-oxides by accelerating its completion, and/or enabling temperature reduction.

On the other hand, a high oxygen content in uranium oxide utilized as nuclear fuel in a reactor is generally overall detrimental. A high oxygen ratio in uranium oxide nuclear fuel reduces the thermal conductivity of the fuel mass, increases the diametral expansion of the body of fuel under irradiation conditions during operation within a nuclear reactor, and the ratio of fission products released from the uranium oxide fuel is increased, among other effects.

The influence of oxygen content upon uranium oxide nuclear fuel is considered in detail in an article entitled "The Storage Behavior of Uranium Dioxide Powders" by M. J. Bannister, *Journal of Nuclear Materials,* 26 (1968), pages 174-184.

SUMMARY OF THE INVENTION

This invention includes an improved production process for inhibiting the spontaneous and uncontrolled oxidation, or pyrophoric reaction of oxides of uranium, which comprises passivating the surface of particles of uranium oxides with the formation of a hydrate compound thereover. The process entails a continuous method for subjecting particulate oxides of uranium to a controlled oxidation reaction system consisting of a precise combination of conditions that provides an oxidation resisting protective surface over the particles of uranium oxide to preserve the existing oxygen/uranium ratio of thermodynamically unstable uranium oxides.

The method of this invention provides a uranium oxide product exhibiting a stabilized oxygen content substantially of the level initially introduced therein and which can be further handled, stored and/or processed in air or other oxygen containing atmospheres without significant changes or increases in the O/U ratio.

OBJECTS OF THE INVENTION

It is a primary object of this invention to provide an improved process for preventing the spontaneous or uncontrolled surface oxidation, or pyrophoric reaction of uranium oxides.

It is also an object of this invention to provide a continuous treatment for thermodynamically unstable oxides of uranium which fixes and preserves the O/U ratio of uranium oxide.

It is an additional object of this invention to provide a continuous production method for passivating the surface of particulate oxides of uranium with an oxidation resisting protective hydrate surface.

It is a further object of this invention to provide a continuous process for forming protective hydrate surface layers on particulate oxides of uranium that inhibit oxygen chemisorption on exposed surface areas of particulate uranium oxide.

It is a still further object of this invention to provide improved means for producing oxides of uranium in particulate form which are resistant to oxidation and stable when handled, stored or processed in air or other oxidizing atmospheres.

It is another object of the continuous process of this invention to provide unstable particulates oxides of uranium with lasting resistance to uncontrolled oxidation of the particle surfaces, including high surface area particles.

DETAILED DESCRIPTION OF THE INVENTION

Figure 1:
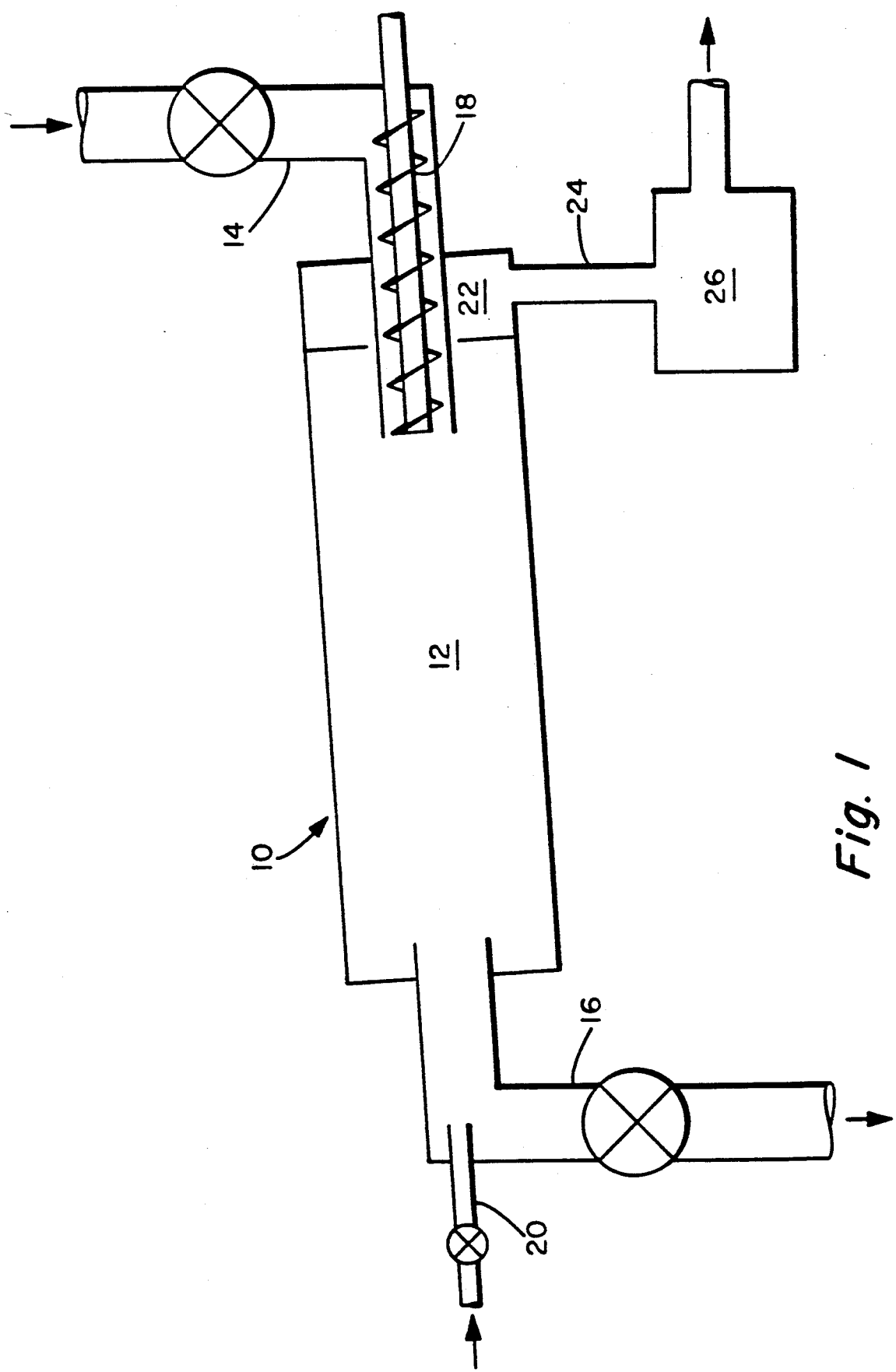
FIG. 1 of the drawings comprises a diagram of a process means for the practice of the method of the invention.

This invention is based upon the discovery of an effective and practical means for passivating unstable oxides of uranium which enhances the properties of the oxides for subsequent processing and use, without detracting from their beneficial attributes, and the resulting passivated oxygen stable uranium oxides. The improved production process of this invention comprise a combination of a specific sequence of conditions which are applied as a continuous treatment to unstable oxides of uranium to overcome their normal affinity for reacting with oxygen. Specifically, this invention entails continuously subjecting the unstable oxides of uranium to a given atmosphere while maintained at a specific temperature range over a limited period of time, including cooling the thus treated oxides of uranium down to approximately room or ambient temperatures.

The oxides of uranium treated according to this invention typically includes the lower order oxides of uranium comprising those having an oxygen to uranium ratio range of about 1.7 to about 2.25/1, such as uranium dioxide ($UO_2$), and thus which are unstable with a predisposition for oxidation to a higher order, for example to $U_3O_8$, $U_3O_7$, $U_4O_9$, etc. upon exposure to air or other oxidizing atmospheres. A common type of uranium oxides for passivation according to the precepts of this invention consists of newly produced uranium dioxide for use in producing nuclear fuel having the usually desired low order oxide contents of an oxygen ratio of about 1.8 to about 2.2/1 and a relatively pristine exposed particle surface.

The occurrence of high order oxides in the uranium oxides used in the manufacturing operations for producing nuclear fuel causes ceramic defects in the sintered uranium oxide pellets such as nonuniform grain size, large open and closed porosity, low sinter density, pits, and high densification. Accordingly, precautions of one means or another should be employed to preclude oxygen as the source of these problems or to control the inherent affinity of low order oxides of uranium for further oxidation to high levels of oxygen content.

In accordance with this invention, unstable oxides of uranium are continuously subjected to a controlled atmosphere containing minuscule proportions of oxygen with the balance an inert or non-oxidizing gaseous medium, such as argon, nitrogen, carbon dioxide, carbon monoxide, methane and the like, and mixtures thereof. The oxygen content for the treatment of the invention should comprise about 0.3 up to about 0.6 percent by volume of the atmosphere. Preferably for most applications of the invention, the oxygen proportion of the ambient treatment atmosphere is about 0.4 to about 0.5 percent by volume.

This controlled atmosphere of appropriate gaseous mixtures is continuously supplied for contacting the uranium oxides throughout the treatment preferably at a rate of approximately 2 to approximately 4 kilograms weight per hour of the particulate uranium oxide to approximately 1 cubic foot per minute of the gaseous mixture. Preferably, is continuously applied at a rate of about one cubic foot of gas per minute for 3 kilograms of particulate oxides of uranium per hour.

Further, in accordance with this invention, the unstable oxides of uranium, while exposed to the controlled atmosphere with the given oxygen content, are maintained in such an environment while held at a temperature within the range of about 40° to about 250° C. Preferably, the temperature conditions applied for the treatment comprise a range of about 50° up to about 200° C.

The apt temperature conditions for the process are most expediently maintained by removing the thermal energy generated in the exothermic oxidation reaction with the gaseous flow supplying the controlled atmosphere. A substantially continuous flow of the oxygen-containing gas mixture passing through the system in contact with the uranium oxide will convey away unwanted heat and govern the oxidation reaction. Thus, a balance between the rate of oxidation and the rate of heat removal by gas convection is preferred.

The duration for the treatment of oxides of uranium by subjecting to the specified atmosphere and temperature is for a time period of at least about 12 minutes up to about 120 minutes. Preferably, the treatment is carried out over a relatively brief and thus economical time of about 12 minutes up to about 18 minutes, depending of course to a considerable degree upon the capacity of the gas treating equipment and the volume of uranium oxide material undergoing treatment.

Further, in accordance with this invention, the controlled atmosphere of inert gas mixed with the prescribed portion of oxygen is applied as a continuous stream counter-current to the particulate oxides of uranium while the uranium oxide particles are passing in a continuous flow through the length of a closed rotating reaction vessel. This counter-current contact between the continuous stream of the oxygen-containing gas atmosphere and the continuous flow of the particles through an elongated vessel provides effective and uniform intermingling of the gas with the particles for even reaction and removal of heat from the uranium oxide particles which terminates the oxidation reaction. The heat removal by the counter-current gas flow is designed to eliminate both the sensible heat of the particles entering the reactor unit and the heat generated by the controlled oxidation reaction and reduce the temperature of the particles at their discharge from the reaction unit to approximately room temperature, namely down to at least about 25° C.

Referring to the drawing, the improved process for passifying particulate oxides of uranium of this invention is carried out in a rotating gas/particle contact reaction vessel such as the cylindrical unit 10 illustrated. Passivation unit 10 comprises an elongated rotatable reaction vessel 12 constructed to provide for high intermingling contact between a continuous flow of particles moving in one direction through the vessel 12 and a continuous stream of flowing gas moving in the opposite direction through the vessel 12.

Passivation unit 10 includes a feed inlet conduit 14 provided with an air lock value(s) for continuously supplying particulate oxides of uranium from a source such as a processing calciner into the reaction vessel 12, and discharge outlet conduit 16 also provided with an air lock value(s) to provide for the continuous passage of the particulate material axially the length of the rotatable vessel 12. Screw feeder 18 assists in supplying a continuous flow of particulate oxides of uranium to the vessel 12.

The counter flowing, continuous stream of oxidizing and cooling gas providing the atmosphere within the rotatable reaction vessel 12 is added to the vessel 12 through a gas supply inlet conduit 20 having an air lock valve(s) which introduces the gas adjacent the particle discharge outlet 16. A gas collecting plenum 22 adjacent the particle inlet 14 and communication with a gas venting outlet conduit 24 having a control value(s), provided to discharge the reactor atmosphere into an off gas filter unit 26 and in turn out to an appropriate disposal.

The residence time for the particulate oxides of uranium in passage continuously through the length of the rotating reactor vessel 12 is a function of the rotational, diameter, length, and slope of the passivating reactor vessel.

The cooling gas atmosphere continuously passing through the reactor vessel 12 in the opposite direction to the continuous flow of particulate oxides of uranium preferably comprises nitrogen containing the prescribed proportion of oxygen. This gas is introduced into the reaction vessel at a relatively low temperature to cool and terminate the reaction of the particulate oxides of uranium. The preferred temperature of the gas at its introduction into the rotary reactor 12 is a range of approximately 18° to 25° C.

The mechanism of this invention, produced by the foregoing imposed conditions of atmosphere, temperature and time, comprises a controlled surface oxidation reaction which produces a protective hydrate surface layer or coating over the uranium oxide particles that inhibits subsequent oxygen chemisorption. The passivating surface of hydrate formed comprises a monohydrate—uranyl hydroxide—($UO_2(OH)_2$) or dihydrate—uranyl hydroxide hydrate—($UO_2(OH)_2 \cdot H_2O$), and typically a combination of both the monohydrate and dihydrate. Moreover, there is evidence of the formation of a second body or intermediate layer between the uranium oxide particle and the protective hydrate surface layer or coating, which is believed to consist of $U_4O_9$ or $UO_{2+x}$.

The proportion of either passivating hydrate formed, monohydrate or dihydrate, is generally controlled by the temperature of the surface of the uranium oxide particles. At a surface temperature of above about 100° C., the controlled oxidation reaction primarily forms the monohydrate. Below about 100° C., the controlled oxidation of the surface primarily forms the dihydrate. The proportion of monohydrate formed increases as the temperature of the surface reaction increases.

The two hydrate compounds, monohydrate and dihydrate, exhibit different properties as shown below:

| Description | Monohydrate (UO$_2$(OH)$_2$) | Dihydrate (UO$_2$(OH)$_2$.H$_2$O) |
|---|---|---|
| Density | 6.70 | 5.0 |
| Color | Black | Brown |
| Crystal Structure | Two methods of bonding uranyl group | Water interleaved between layers |

The controlled surface oxidation pursuant to the precepts at this invention produces a hydrate layer or coating of a thickness of about 3 to about 10 Angstroms.

Upon completion of the formation of a passivating hydrate layer covering the uranium oxide particles, the treated material should be promptly cooled to room temperature. Cooling quickly to at least about 25° C. completes the crystallization process of the newly formed hydrate and prevents an accelerated rapid continuing oxidation reaction.

The passivating hydrate particle surface portion formation by the imposed reaction conditions of this invention are summarized by the following equations together with their heat of reaction.

Dihydrate or Monohydrate Reaction $$UO_2 + \tfrac{1}{2} O_2 + yH_2O \rightarrow UO_2(OH)_2 \cdot yH_2O: \Delta H_r = -50.5 \text{ kcal/gm-mole}$$

U$_4$O$_9$ Reaction $$UO_2 + \tfrac{1}{8} O_2 \rightarrow UO_{2.25} \quad \Delta H_r = -10.9 \text{ kcal/gm-mole}$$

$$4UO_2 + \tfrac{1}{2} O_2 \rightarrow U_4O_9$$

The process design of this invention entails the transfer and dissipation of the sensible heat and reaction heat from the particulate oxides of uranium through the counter flowing gas stream for controlling and terminating the hydration reaction. The following equations demonstrate the temperature reducing reaction conditions:

Heat Transfer to Gas = Hydrate Heat of Reaction +

U$_4$O$_9$ Heat of Reaction + Sensible Heat of Powder Feed

In Mathematical Terms:

$$FC_p(T_{gout} - T_{gin}) = (\Delta H_r)_{hydrate} * \text{(Rate of Hydrate Formation)} +$$

$$(\Delta H_r) \text{Rate of U}_4\text{O}_9 \text{ Formation}) + W_p C_p(T_{pin} - T_{pout})$$

Where
F—Gas flow rate
$W_p$—Powder Feed Rate
$T_g, T_p$—Gas and Powder Temperature
$H_r$—Heat of Reaction
$C_p$—Specific Heat The oxygen concentration of the countercurrent feed gas to the passivator is a function of the final O/U ratio of the powder discharged. This is given by the following equation.

$$FC = W_p(O/U_f - 2.000)$$

where
C—fraction of oxygen in the gas stream
O/U$_f$—O/U ratio of the powder discharged The concentration of oxygen in the entering gas has a range of 0.3 to 0.6 percent.

Examples of the enhanced process conditions and effects are demonstrated by the following evaluations.

A mathematical model of the improved passivation process of this invention is provided to illustrate the effects of operating parameters upon the product characteristics. The above equations describe the oxidation reaction and heat transfer effects occurring within the system. Based upon a given set of input parameters, the below product characteristics are ascertained.

Input Parameters
1. Final O/U Ratio = 2.040
2. Gas Flow = 20 ft$^3$/min
3. Powder Flow = 60 kgs/hr
4. Surface Area = 3.5 m$^2$/gm
5. Bulk Density = 2 gm/cm$^3$

| Output Parameters | Process |
|---|---|
| 1. Oxygen Concentration = 0.39% | Overall Mass Balance powder to gas |
| 2. Gas temperature vs. passivator length | Heat transfer from powder to gas |
| 3. Powder temperature vs. passivator length | Loss of heat from powder to gas stream and heat generation from oxidation reaction |
| 4. Oxygen concentration in gas stream vs. passivator length | Oxidation reaction |

This model allows a parametric investigation of the passivation process for a continuous flow of UO$_2$ powder. Table 1 summarizes these results.

TABLE 1

Summary of Passivator Model Calculations

| Flow ft3/min | Inlet Conc. % O2 | O/U (%) (Hydrate) | O/U Hydrate | O/U Total | Max. Powder Temp. (°C.) | Type of Hydrate |
|---|---|---|---|---|---|---|
| I. Operating Conditions and Specified Final O/U Ratio ||||||||
| Surface Area = 3.5 m2/gm ||||||||
| Powder Flow = 60 kgs/hr ||||||||
| Bulk Density = 2.0 gm/cm3 ||||||||
| O/U (Tot) = 2.040 (Specified) ||||||||
| A. Calculated Operating Conditions and Final O/U Ratio ||||||||
| 20.0 | 0.29 | 50.0 | 2.019 | 2.040 | 58.7 | Dihydrate |
| 15.0 | 0.39 | 60.0 | 2.024 | 2.041 | 77.6 | Dihydrate |
| 12.0 | 0.49 | 70.0 | 2.027 | 2.040 | 104.8 | Monohydrate |
| II. Operating Conditions and Specified Final O/U Ratio ||||||||
| Surface Area = 3.5 m2/gm ||||||||
| Powder Flow = 60 kgs/hr ||||||||
| Bulk Density = 2.0 gm/cm3 ||||||||
| O/U (Tot) = 2.060 (Specified) ||||||||

TABLE 1-continued

Summary of Passivator Model Calculations

| Flow ft3/min. | Inlet Conc. % O2 | O/U (%) (Hydrate) | O/U Hydrate | O/U Total | Max. Powder Temp. (°C.) | Type of Hydrate |
|---|---|---|---|---|---|---|
| A. Calculated Operating Conditions and Final O/U Ratio ||||||||
| 20.0 | 0.44 | 60.0 | 2.035 | 2.060 | 74.2 | Dihydrate |
| 15.0 | 0.59 | 60.0 | 2.041 | 2.061 | 97.5 | Dihydrate |
| 12.0 | 0.73 | 65.0 | — | 2.250 | Infinite | Black Powder |
| III. Operating Conditions and Specified Final O/U Ratio |||||||
| Surface Area = 3.5 m2/gm |||||||
| Powder Flow = 60 kgs/hr |||||||
| Bulk Density = 2.0 gm/cm3 |||||||
| O/U (Tot) = 2.060 (Specified) |||||||
| A. Calculated Operating Conditions and Final O/U Ratio |||||||
| 20.0 | 0.59 | 65.0 | 2.052 | 2.079 | 87.0 | Dihydrate |
| 15.0 | 0.78 | 80.0 | 2.060 | 2.081 | 114.7 | Monohydrate |
| 12.0 | 0.98 | 80.0 | — | 2.250 | Infinite | Black Powder |

What is claimed is:

1. A method of passivating the surface portion of particulate oxides of uranium with the formation thereon of a protective hydrate surface layer to inhibit oxygen chemisorption of the particle surfaces comprising the steps of:
   passing a continuous flow of particulate oxides of uranium through the length of a rotating reaction vessel moving in intermingling contact with a counter-current continuous stream of a cooling gas comprising oxygen combined with an inert gas atmosphere in a proportion of about 0.3 up to about 0.6 percent oxygen by volume of the atmosphere.

2. The method of passivating of claim 1, wherein the particulate oxides of uranium are cooled down to a temperature of at least about 25° C.

3. The method of passivating of claim 1, wherein the cooling gas comprises oxygen combined with nitrogen.

4. The method of passivating of claim 1, wherein the ratio of the flow of particulate oxides of uranium to the stream of cooling gas is approximately 2 to 4 kilograms per hour of the oxides of uranium to approximately 1 cubic foot per minute of cooling gas.

5. A method of passivating the surface portion of the particulate oxides of uranium with the formation thereon of a protective hydrate surface layer to inhibit oxygen chemisorption of the surface of the oxides of uranium particles, comprising the steps of:
   passing a continuous flow of hot particulate oxides of uranium through the length of a rotating reactor vessel moving in intermingling contact with a counter-current continuous stream of a cooling gas comprising oxygen combined with an inert gas in a proportion of about 0.3 up to about 0.6 percent oxygen by volume of the cooling gas, and thereby cooling the hot particulate oxides of uranium down to at least about 25° C.

6. The method of passivating of claim 5, wherein the cooling gas comprises oxygen combined with nitrogen.

7. The method of passivating of claim 5, wherein the ratio of the flow of particulate oxides of uranium to the stream of cooling gas is approximately 3 kilograms per hour of the oxides of uranium to approximately 1 cubic foot per minute of cooling gas.

8. The method of passivating of claim 5, wherein the protective hydrate layer formed on the surface of the particulate oxides of uranium is predominately a dihydrate.

9. The method of passivating of claim 5, wherein the protective hydrate layer formed on the surface of the particulate oxides of uranium is predominately a monohydrate.

10. A method of passivating the surface portion of particulate oxides of uranium with the formation thereon of a protective hydrate surface layer to inhibit oxygen chemisorption of the surface of the oxides of uranium particles, comprising the steps of:
   passing a continuous flow of hot particulate oxides of uranium through the axial length of a rotating reactor vessel moving therethrough in intermingling surface contact with a counter-current continuous flowing stream of a cooling gas comprising oxygen combined with an inert gas in a proportion of about 0.3 up to about 0.6 percent oxygen by volume of the cooling gas, and thereby forming a protective hydrate layer on the surface of the particulate oxides of uranium down to at least about 25° C.

11. The method of passivating of claim 10, wherein the cooling gas comprises oxygen combined with the inert gas in a proportion of about 0.4 to about 0.5 percent oxygen by volume of the cooling gas.

12. The method of passivating of claim 10, wherein the cooling gas comprises oxygen combined with nitrogen.

13. The method of passivating of claim 10, wherein the ratio of the flow of particulate oxides of uranium to the stream of cooling gas is approximately 2 to 4 kilograms per hour of the oxides of uranium to approximately 1 cubic foot per minute of cooling gas.

14. The method of passivating of claim 10, wherein the protective hydrate layer formed on the surface of the particulate oxides of uranium is predominately a dihydrate.

15. The method of passivating of claim 10, wherein the protective hydrate layer formed on the surface of the particulate oxides of uranium is predominately a monohydrate.

16. A method of passivating the surface portion of particulate oxides of uranium with the formation thereon of a protective hydrate surface layer to inhibit oxygen chemisorption of the surface of the oxides of uranium particles, comprising the steps of:
   passing a continuous flow of hot particulate oxides of uranium introduced at a temperature of about 40° to about 60° C. through the axial length of a rotating reactor vessel moving therethrough in intermingling surface contact with a counter-current continuous flowing stream of a cooling gas introduced at a temperature of about 15° to 25° C. and comprising oxygen combined with an inert gas in a proportion of about 0.3 up to about 0.6 percent oxygen by volume of the cooling gas, and thereby forming a protective hydrate layer on the surface of the particulate oxide of uranium and cooling the hot particulate oxides of uranium down to at least about 25° C.

17. The method of passivating of claim 16, wherein the cooling gas comprises oxygen combined with nitrogen.

18. A method of passivating the surface portion of particulate oxides of uranium with the formation thereon of a protective hydrate surface layer to inhibit oxygen chemisorption of the surface of the oxides of uranium particles, comprising the steps of:

passing a continuous flow of hot particulate oxides of uranium introduced at a temperature of about 40° to about 60° C. axially through a closed elongated rotating reactor vessel moving therethrough in intermingling surface contact with a counter-current continuous flowing stream of a cooling gas introduced into the rotating reaction vessel at a temperature of about 15° to 25° C. and comprising oxygen combined with nitrogen in a proportion of about 0.3 up to about 0.6 percent oxygen by volume of the cooling gas, and thereby forming a protective hydrate layer on the surface of the particulate oxide of uranium and cooling the hot particulate oxides of uranium down to at least about 25° C.

19. The method of passivating of claim 18, wherein the ratio of the flow of particulate oxides of uranium to the stream of cooling gas is approximately 2 to 4 kilograms per hour of the oxides of uranium to approximately 1 cubic foot per minute of cooling gas.

20. The method of passivating of claim 18, wherein the cooling gas introduced into the rotating reaction vessel ranges from a temperature of approximately 18° to 25° C.

* * * * *